(12) United States Patent
Yang et al.

(10) Patent No.: US 11,615,549 B2
(45) Date of Patent: Mar. 28, 2023

(54) IMAGE PROCESSING SYSTEM AND IMAGE PROCESSING METHOD

(71) Applicant: HTC Corporation, Taoyuan (TW)

(72) Inventors: Tung-Ting Yang, Taoyuan (TW);
Chun-Li Wang, Taoyuan (TW);
Cheng-Hsien Lin, Taoyuan (TW);
Hung-Yi Yang, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 433 days.

(21) Appl. No.: 16/669,669

(22) Filed: Oct. 31, 2019

(65) Prior Publication Data

US 2020/0184671 A1 Jun. 11, 2020

Related U.S. Application Data

(60) Provisional application No. 62/776,411, filed on Dec. 6, 2018.

(51) Int. Cl.
*G06K 9/62* (2022.01)
*G06T 7/70* (2017.01)
(Continued)

(52) U.S. Cl.
CPC ............ *G06T 7/70* (2017.01); *G02B 27/0093* (2013.01); *G02B 27/0172* (2013.01); *G06F 3/013* (2013.01); *G06F 3/017* (2013.01); *G06F 3/0482* (2013.01); *G06F 3/04815* (2013.01); *G06T 7/11* (2017.01); *G06T 7/187* (2017.01);
(Continued)

(58) Field of Classification Search
CPC .......... G06F 3/011; G06F 3/012; G06F 3/013; G06F 3/017; G06F 3/005; G06F 3/016; G06F 3/04817; G06F 11/1471; G06F 11/2071; G06F 11/2074; G06F 11/2076; G06F 13/14; G06F 13/40; G06F 16/2379; G06F 16/273; G06F 2201/84; G06F 2201/855; G06F 2203/04804; G06T 19/006; G06T 7/11; G06T 19/003; G06T 2200/04; G06T 2207/10016; G06T 7/20; G06T 7/593; G06T 7/70; G06T 15/20; G06T 17/00; G06T 19/20; G06T 2219/2008; G06T 3/40; G06T 2219/2021
See application file for complete search history.

(56) References Cited

U.S. PATENT DOCUMENTS

2013/0028470 A1 1/2013 Kanda
2017/0084084 A1* 3/2017 Durham .............. G06F 3/04842
(Continued)

FOREIGN PATENT DOCUMENTS

CN 101872237 A 10/2010
CN 106056092 A 10/2016

*Primary Examiner* — Quan M Hua
(74) *Attorney, Agent, or Firm* — Birch, Stewart, Kolasch & Birch, LLP (57) ABSTRACT

An image processing method includes the following steps: dividing an object block into a two-dimensional image; identifying at least one view hotspot in a viewing field corresponding to pupil gaze direction; receiving the view hotspot and an indicator signal; wherein the indicator signal is used to remark the object block; and generating a mask block that corresponds to the object block according to the view hotspot; wherein the indicator signal determines the label of the mask block.

10 Claims, 6 Drawing Sheets

(51) Int. Cl.
*G06T 7/187* (2017.01)
*G06T 19/00* (2011.01)
*G06F 3/01* (2006.01)
*G06F 3/0482* (2013.01)
*G06F 3/04815* (2022.01)
*G02B 27/00* (2006.01)
*G02B 27/01* (2006.01)
*H04N 5/33* (2023.01)
*G06T 7/11* (2017.01)
*G06V 40/18* (2022.01)

(52) U.S. Cl.
CPC ............ *G06T 19/006* (2013.01); *G06V 40/18* (2022.01); *H04N 5/33* (2013.01); *G02B 2027/0138* (2013.01); *G02B 2027/0178* (2013.01); *G06T 2207/20021* (2013.01); *G06T 2207/20084* (2013.01); *G06T 2207/30041* (2013.01)

(56) References Cited

U.S. PATENT DOCUMENTS

| | | | |
|---|---|---|---|
| 2017/0278308 A1* | 9/2017 | Bleiweiss | G06T 19/006 |
| 2017/0337742 A1* | 11/2017 | Powderly | G06F 3/012 |
| 2018/0189354 A1* | 7/2018 | Paine | G06F 3/167 |
| 2018/0341811 A1* | 11/2018 | Bendale | G06T 7/20 |
| 2020/0368616 A1* | 11/2020 | Delamont | A63F 13/25 |

* cited by examiner

IMAGE PROCESSING SYSTEM AND IMAGE PROCESSING METHOD

CROSS REFERENCE TO RELATED APPLICATIONS

This application claims the benefit of U.S. Provisional Application No. 62/776,411, filed Dec. 6, 2018, the entirety of which is/are incorporated by reference herein.

BACKGROUND OF THE INVENTION

Field of the Invention

The present disclosure relates to a processing system and, in particular, to an image processing system and an image processing method.

Description of the Related Art

In general, a two-dimensional image can be segmented by a known model, such as a convolutional neural network (CNN) model, to segment multiple objects in a two-dimensional image. Moreover, each object is assigned a different color to output a mask map. The position and block of each object in the two-dimensional image can be known from the mask map. After determining the distribution position and block of the object, a known three-dimensional reconstruction method can be performed, such as Shape From Texture (SFT), Shape From Shading, and Multi-View Stereo, Structured Light, etc., to construct a three-dimensional object. These three-dimensional objects can play an auxiliary role in research, such as the protection of cultural relics, game development, architectural design, and clinical medicine.

However, after segmenting a plurality of objects into the two-dimensional image, the system may not be able to distinguish the specific object, or the shape of the specific object may be difficult to distinguish. For example, it is difficult for the system to accurately determine whether the specific object is a door or a window. Moreover, it is also difficult to distinguish a seat with an artistic shape.

Therefore, how to make the system correctly mark each object has become one of the problems to be solved in the field.

BRIEF SUMMARY OF THE INVENTION

In accordance with one feature of the present invention, the present disclosure provides an image processing system. The image processing system includes a processor and a gaze detector. The processor divides an object block into a two-dimensional image. The gaze detector identifies at least one view hotspot in a viewing field corresponding to a pupil gaze direction. The processor receives the view hotspot and an indicator signal, the indicator signal is used to remark the object block, and the processor generates a mask block corresponding to the object block according to the view hotspot, and the indicator signal determines a label for the mask block.

In accordance with one feature of the present invention, the present disclosure provides an image processing method. The image processing method includes the following steps: dividing an object block into a two-dimensional image; identifying at least one view hotspot in a viewing field corresponding to a pupil gaze direction; receiving the view hotspot and an indicator signal; wherein the indicator signal is used to remark the object block; and generating a mask block corresponding to the object block according to the view hotspot; wherein the indicator signal determines the label of the mask block.

The embodiments of the present invention provide an image processing system and an image processing method, which are used to label a mask block of an object block into a two-dimensional image through the application of the view hotspot and the indicator signal. For example, after segmenting a plurality of objects into a two-dimensional image, the image processing system and the image processing method can recognize the specific object, and the application of the view hotspot and the indicator signal can accurately mark the specific object. Even artistic objects or objects of special shape can be labeled with view hotspots and indicator signals. Therefore, the image processing system and the image processing method of the present invention achieve a more accurate effect of labeling a mask block.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "comprises" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
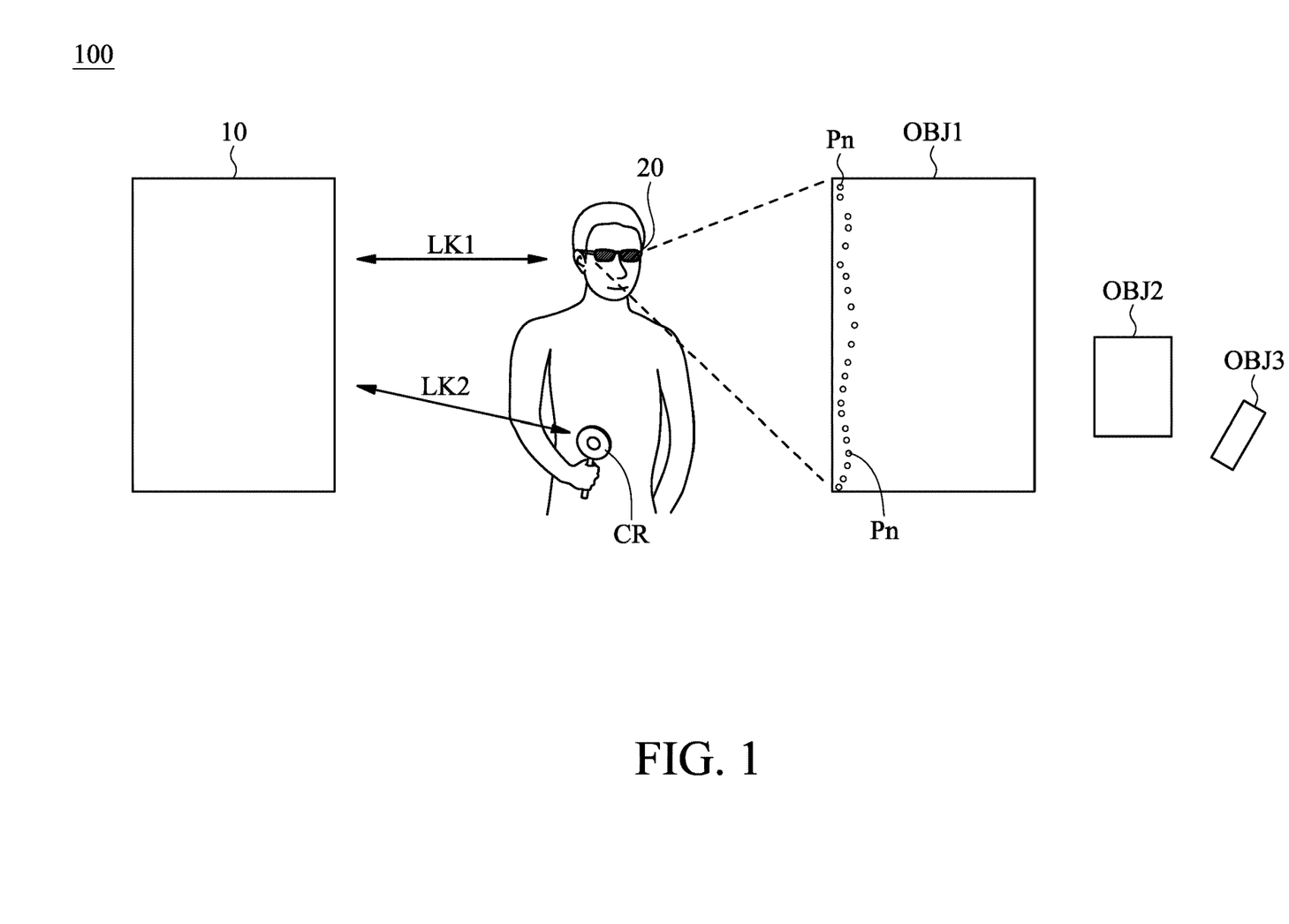
FIG. 1 is a schematic diagram of an image processing system in accordance with one embodiment of the present disclosure.
Figure 2:
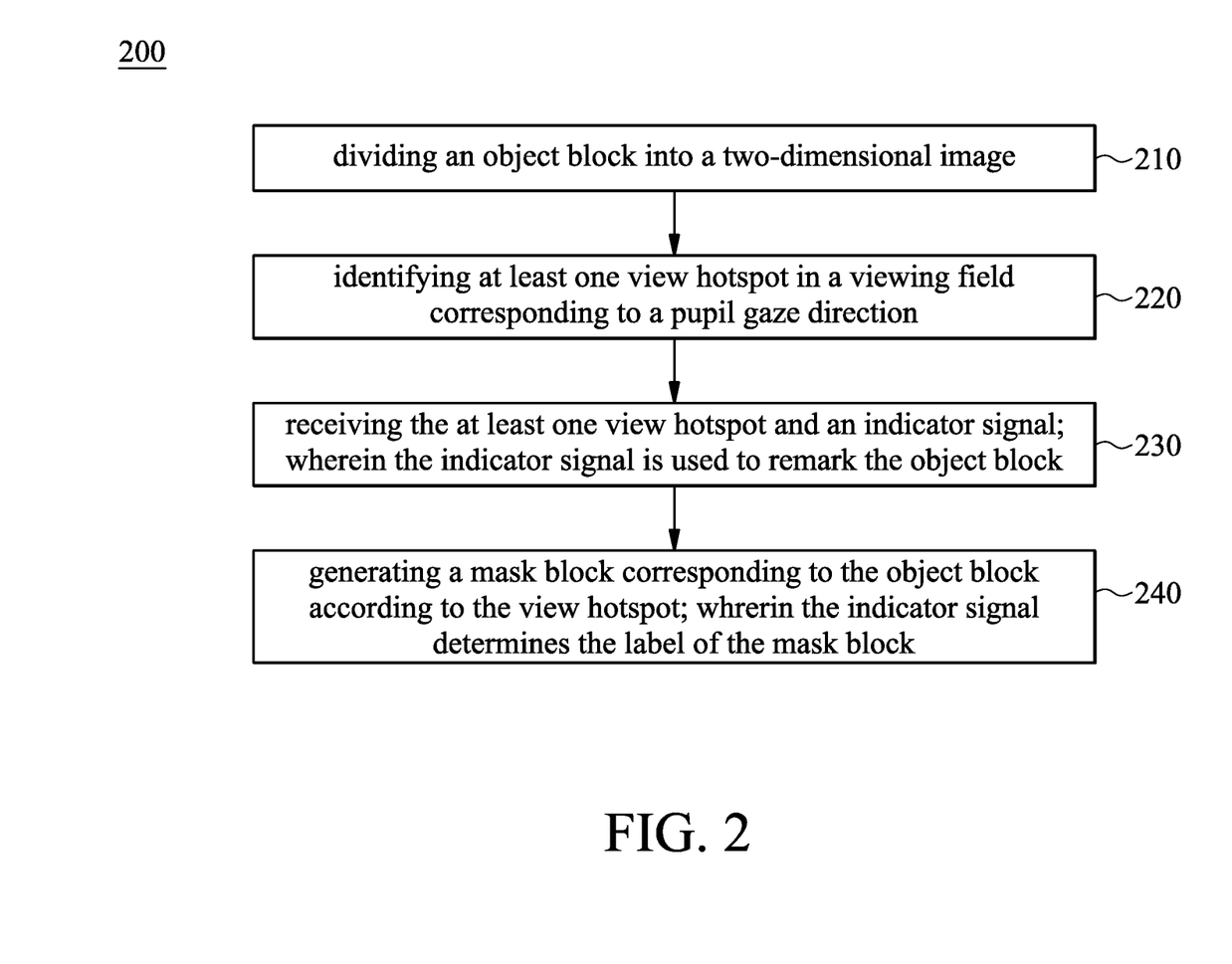
FIG. 2 is a flowchart of an image processing system in accordance with one embodiment of the present disclosure.
Figure 3A:
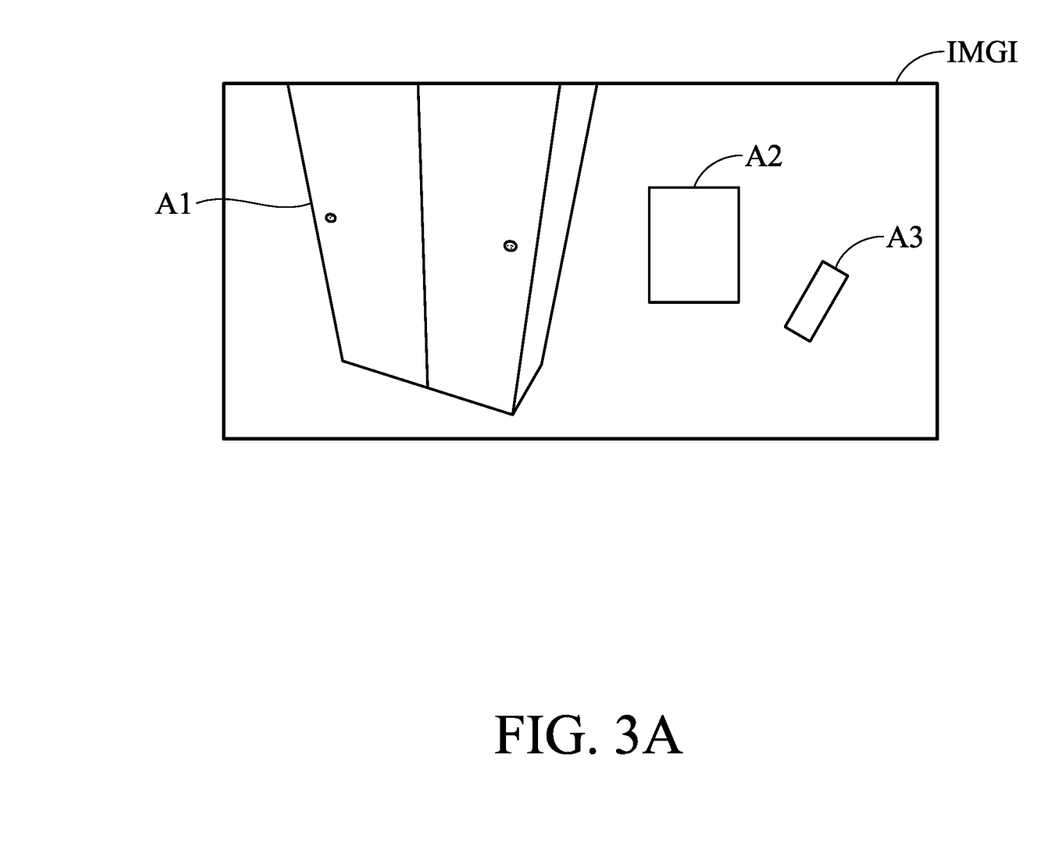
FIG. 3A is a schematic diagram of an initial image in accordance with one embodiment of the present disclosure.
Figure 3B:
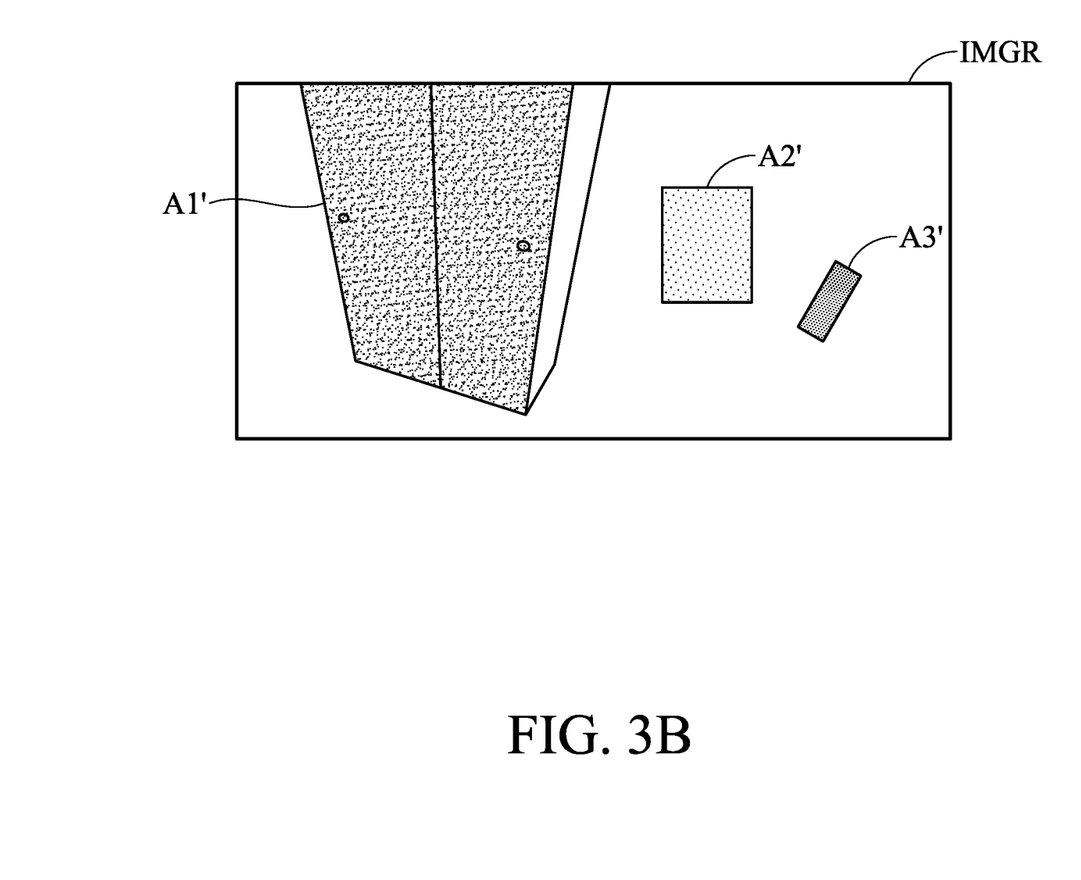
FIG. 3B is a schematic diagram of a mask map in accordance with one embodiment of the present disclosure.
Figure 4:
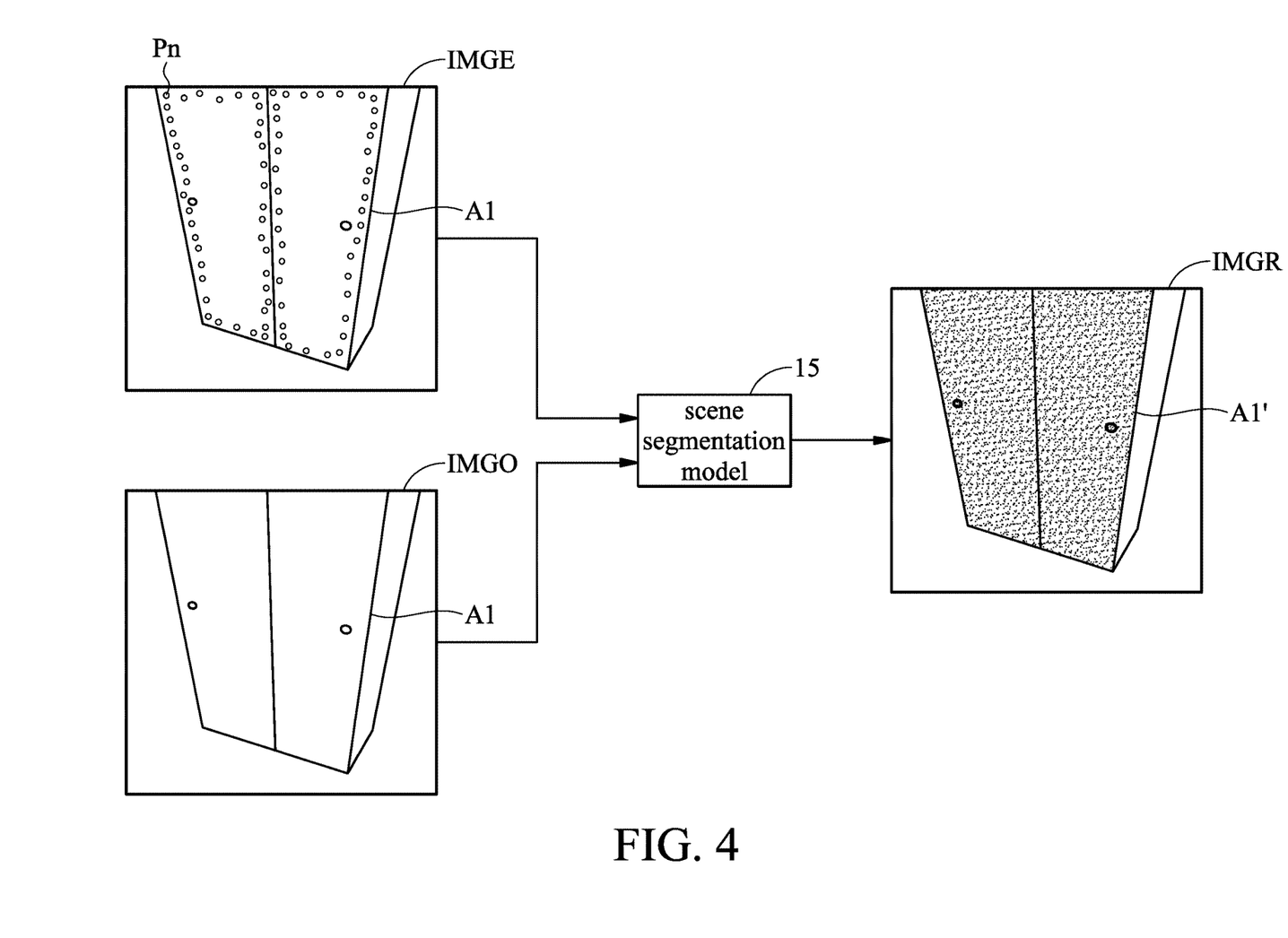
FIG. 4 is a schematic diagram of an image processing method in accordance with one embodiment of the present disclosure.
Figure 5:
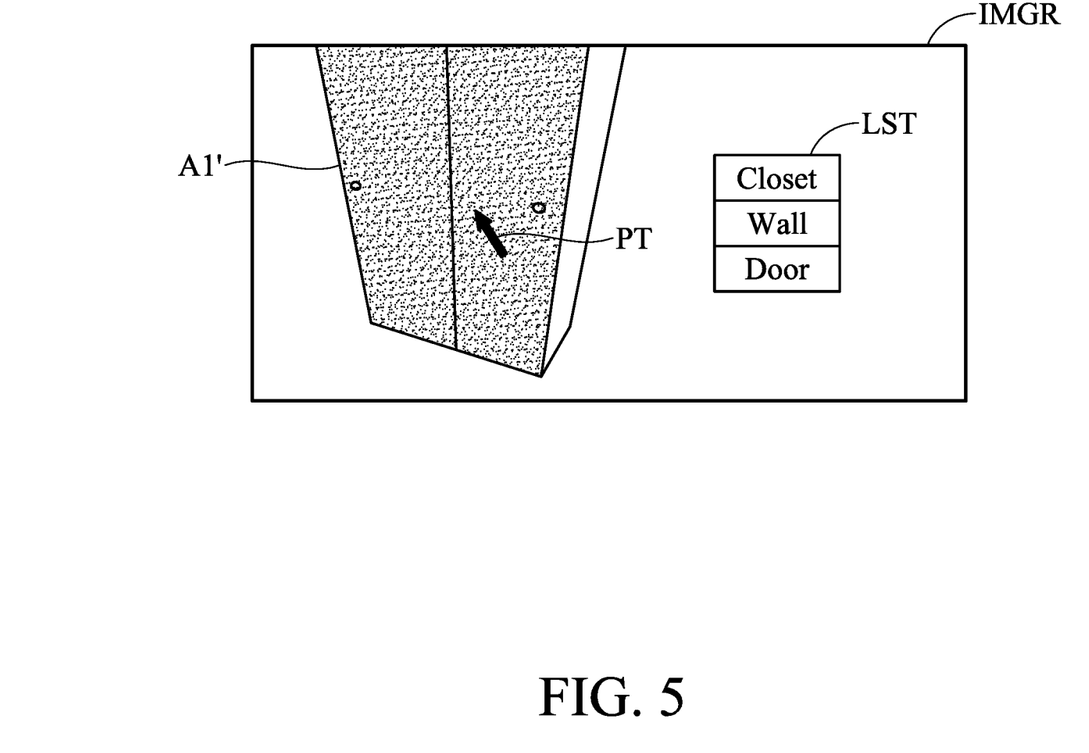
FIG. 5 is a schematic diagram of a display image in accordance with one embodiment of the present disclosure.

Please refer to FIGS. 1-5, FIG. 1 is a schematic diagram of an image processing system 100 in accordance with one embodiment of the present disclosure. FIG. 2 is a flowchart of an image processing system 200 in accordance with one embodiment of the present disclosure. FIG. 3A is a schematic diagram of an initial image IMGI in accordance with one embodiment of the present disclosure. FIG. 3B is a schematic diagram of a mask map IMGR in accordance with one embodiment of the present disclosure. FIG. 4 is a schematic diagram of an image processing method in accordance with one embodiment of the present disclosure. FIG. 5 is a schematic diagram of a display image in accordance with one embodiment of the present disclosure.

In one embodiment, the image processing system 100 can be applied to identify an object portion in a virtual reality system. Generally, by inputting an image to the convolutional neural networks (CNN) model, the result of which category the image belongs to can be obtained. This process is called as classification. However, in real-world application scenarios, it is common to identify all objects that appear from a picture and mark location of the objects (Object Localization). This can be used for graph-based image segmentation through CNN model, R-CNN (Regions with CNN) model or other algorithms that can be applied to segment the images. However, those of ordinary skill in the art should understand that the present invention is not limited to the use of the CNN model. Other neural network models that can achieve scene segmentation can also be applied.

In one embodiment, the processor 10 applies a scene segmentation model to segment the object blocks into the two-dimensional image and generate a mask of the object block. The scene segmentation model can be implemented by CNN model, R-CNN (Regions with CNN) model or other algorithms that can be applied to segment the images.

For example, when the processor 10 applies the CNN model to analyze an indoor image, the CNN model identifies the probabilities of 15 objects (such as bed, wall, closet, window, mop . . . , etc.) appear in each block of the indoor image. For example, the recognition result of these 15 objects of the CNN model shown in FIG. 3B is that the probability of the object block A1 being a bed is 10%, the probability of being a wall is 20%, the probability of being a wardrobe is 90%, etc. Among these probabilities, the object block A1 is the most likely to be a closet, so the object block A1 is regarded as a closet.

In one embodiment, processor 10 generates a mask map according to these probabilities. Each block in the mask represents an object.

For example, as shown in FIG. 3A, the initial image IMGI captured by the augmented reality glasses 20 is an indoor image. This indoor image contains object blocks A1-A3. Next, the processor 10 analyzes the indoor image using the CNN model. As shown in FIG. 3B, assuming the CNN model recognizes that the object block A1 in the indoor image having the highest probability is the closet, the object block A1 is marked as the mask block A1'. Assuming the CNN model recognizes that the object block A2 in the indoor image having the highest probability is the window, the object block A2 is marked as the mask block A2'. Assuming the CNN model recognizes that the object block A3 in the indoor image having the highest probability is the mop, the object block A3 is marked as the mask block A3'. The block distribution of this mask map can be regarded as image segmentation, that is, each mask block corresponds to an object block.

In one embodiment, after segmenting each object in the image, the processor 10 performs a three-dimension reconstruction of the object block to produce a three-dimensional object. For example, a mask block that is marked as a closet block is three-dimensionally reconstructed to produce a three-dimensional reconstructed image of the closet for subsequent use by the software. The three-dimensional reconstruction method can apply known algorithms to implement, such as Shape From Texture (SFT), Shape From Shading, Multi-View Stereo, and Structured Light . . . and so on.

In order to further improve the correctness of recognizing the object in the image, an image processing system and an image processing method are provided as below.

In FIG. 1, the objects OBJ1 to OBJ3 are included in a viewing field (for example, a part of an indoor space). The user wears augmented reality glasses 20 and looks toward the object OBJ1. The gaze detector in the augmented reality glasses 20 is configured to recognize at least one view hotspot Pn (represented by a hollow circle) in the viewing field corresponding to the pupil gaze direction. The view hotspot Pn represents the gaze location of the user through the augmented reality glasses 20 in the field of view. More specifically, the augmented reality glasses 20 are cameras within the function for capturing an outwardly photographing environment object, and a head mounted display device within a gaze detector for inwardly detecting the user's gaze.

In one embodiment, the augmented reality glasses 20 can capture a plurality of two-dimensional images with the movement of the user. The augmented reality glasses 20 performs the subsequent processing on these two-dimensional images together or separately.

In one embodiment, the communication link LK1 is established between the augmented reality glasses 20 and the processor 10 by wire or wirelessly. The augmented reality glasses 20 can transmit the view hotspot Pn and/or the images captured by the augmented reality glasses 20 to the processor 10 via the communication link LK1.

In one embodiment, a communication link LK2 is established between the processor 10 and a controller CR in a wired or wireless manner.

In one embodiment, the processer 10 can be any electronic device having a calculation function. The processer 14 can be implemented using an integrated circuit, such as a microcontroller, a microprocessor, a digital signal processor, an application specific integrated circuit (ASIC), or a logic circuit.

In one embodiment, the user can hold the controller CR and operate the game or application through the controller CR to interact with objects in the virtual reality world or objects in the augmented reality. The present invention is not limited to the use of the controller CR, and any device that can operate the game or application or any method that can control the display of the indicator signal (for example, using gestures or electronic gloves) can be applied.

Please refer to FIGS. 2-5 together, and the image processing method will be described in detail below.

In step 210, the processor 10 divides an object block A1 into a two-dimensional image. For example, the augmented reality glasses 20 transmit the captured two-dimensional image IMGO (the two-dimensional image IMGO is, for example, a part or all of the initial image IMGI) to the processor 10. The processor 10 applies the scene segmentation model 15 to segment the object block A1 into the two-dimensional image IMGO and creates a mask for the region of the object block A1.

In this step, the processor 10 can directly segment all the object blocks A1, A2, and A3 into the two-dimensional image to generate corresponding mask blocks A1', A2' and A3' (as shown in FIG. 3B).

For convenience of explanation, since the subsequent embodiment is represented by the object block A1, the object blocks A2, A3 can label the corresponding mask blocks A2' and A3' in the same manner. Therefore, only the object block A1 will be described later to serve as an example.

In step 220, the gaze detector identifies at least one view hotspot Pn in a viewing field corresponding to a pupil gaze direction. The pupil gaze direction means the view point or the view direction that a user is looking or looked at.

As shown in FIG. 4, the augmented reality glasses 20 mark a plurality of view hotspots Pn (represented by hollow circles) on the captured two-dimensional image to generate a hotspot map IMGE.

In one embodiment, the augmented reality glasses 20 include an infrared camera. The infrared camera is configured to capture an eyeball image. The augmented reality glasses 20 recognize pupil shape from the eyeball image and detect the user's gaze direction. The view hotspot Pn in the viewing field corresponding to the pupil gaze angle is identified by the user's gaze direction and the image position of the augmented reality glasses 20.

In step 230, in one embodiment, the processor 10 receives the view hotspot Pn and an indicator signal PT. The indicator signal PT is used to remark the object block A1. In one embodiment, the indicator signal PT can also be generated by the augmented reality glasses 20. For example, the indicator signal PT is generated according to the length of time that the user observes the gaze point detected by the gaze detector.

In one embodiment, the scene segmentation model 15 is implemented by a CNN model.

In one embodiment, as shown in FIG. 4, after receiving the view hotspot Pu, the processor 10 generates a hotspot image IMGE according to the view hotspot Pn, and inputs the hotspot image IMGE and the two-dimensional image IMGO into the CNN model to identify the object block A1 in the two-dimensional image IMGO, and generates a mask of the object block A1 to generate a mask map IMGR.

In other words, the hotspot map IMGE is generated by marking the view hotspot Pn in the two-dimensional image IMGO. The two-dimensional image IMGO is the original image captured by the augmented reality glasses 20. The mask map IMGR is an output image of the scene segmentation model 15. The mask map IMGR includes a mask A1', which means the object block A1 is recognized.

Therefore, since the input of the CNN model is not only the two-dimensional image IMGO but also the hotspot image IMGE, it makes that the position and the shape of the object block A1 recognized by the CNN model are more accurate.

In one example, the augmented reality glasses 20 or other prompting devices (e.g., earphones) can prompt the user to see a specific object (for example, showing "please see the closet" on the augmented reality glasses 20 and/or the headset sends a "please see the closet" prompt), and the user will look in the direction of the closet. The augmented reality glasses 20 thereby obtain a view hotspot Pn corresponding to the closet. Moreover, the augmented reality glasses 20 generate a hotspot map IMGE according to the view hotspot Pn.

Therefore, when the hotspot map IMGE and the two-dimensional image IMGO are input to the CNN model, the position and shape of the object block A1 (i.e., the image block corresponding to the closet) recognized by the CNN model can be made more precisely.

In one embodiment, the processor 10 performs a three-dimensional reconstruction of the object block A1 to generate a three-dimensional object, such as a three-dimensional closet.

In step 240, the processor 10 generates a mask block A1' corresponding to the object block A1 according to the view hotspot Pn, and the indicator signal PT determines the label of the mask block A1'.

In an embodiment, the display screen of the display of the augmented reality glasses 20 is shown in FIG. 5. The display screen shows at least a portion of the mask map IMGR, a menu LST, a mask block A1' and an indicator signal PT. The mask block A1 can be selectively displayed. The object block A1 in the original image (i.e., the two-dimensional image IMGO) corresponds to the mask block A1'.

In one embodiment, the processor 10 can directly mark the mask block A1' of the object block A1. Or, the processor 10 can selectively mark the object block A1 as the mask block A1', and then the controller CR transmits the indicator signal PT to augmented reality glasses 20. The augmented reality glasses 20 display the menu LST according to the indicator signal PT. The menu LST lists a plurality of candidate items. Candidate items are, for example, a closet, a wall, and a door. The processor 10 regards one of the candidate items in which the view hotspot Pn as the label of the mask block A1'. For example, if the view hotspot Pn falls in the closet, the processor 10 marks the mask block A1' as a closet.

In one embodiment, the processor 10 can directly mark the object block A1. Or, the processor 10 can selectively mark the object block A1 as the mask block A1', and then the user can directly use the controller CR to select one of the candidate items. For example, if the user clicks on the closet in the candidate items with the controller CR, the processor 10 marks the mask block A1' as a closet.

In summary, the embodiments of the present invention provide an image processing system and an image processing method, which are used to label a mask block of an object block into a two-dimensional image through the application of the view hotspot and the indicator signal. For example, after segmenting a plurality of objects into a two-dimensional image, the image processing system and the image processing method can recognize the specific object, and the application of the view hotspot and the indicator signal can accurately mark the specific object. Even artistic objects or objects of special shape can be labeled with view hotspots and indicator signals. Therefore, the image processing system and the image processing method of the present invention achieve a more accurate effect of labeling a mask block.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:
1. An image processing system, comprising:
a processor, configured to divide an object block into a two-dimensional image;

a gaze detector, configured to identify at least one view hotspot in a viewing field corresponding to a pupil gaze direction; and a controller, configured to transmit an indicator signal to augmented reality glasses, wherein, the processor receives the at least one view hotspot and the indicator signal, the indicator signal is used to remark the object block, and the processor generates a mask block corresponding to the object block according to the at least one view hotspot, and the indicator signal determines a label for the mask block, wherein the augmented reality glasses display a menu according to the indicator signal, and the menu lists a plurality of candidate items; wherein the processor regards one of the candidate items in which there is at least one view hotspot as the label of the mask block, and wherein the controller is hold and operated to interact with the mask block in the augmented reality glasses, and to select the one of the candidate items in order to determine the label for the mask block by the processor.

2. The image processing system of claim 1, wherein the processor generates a hotspot map according to the at least one view hotspot, and the processor inputs the hotspot map and the two-dimensional image into a convolutional neural network (CNN) model to identify the object block of the two-dimensional image.

3. The image processing system of claim 1, wherein the processor applies a scene segmentation model to segment the object block into the two-dimensional image and to mask the object block.

4. The image processing system of claim 1, wherein the processor is further configured to perform a three-dimensional reconstruction of the mask block to generate a three-dimensional object.

5. The image processing system of claim 1, wherein the gaze detector is comprised in augmented reality glasses; the augmented reality glasses comprise an infrared camera; the infrared camera is configured to capture an eyeball image; the augmented reality glasses recognize pupil shape from the eyeball image, and detect a user's gaze direction; the at least one view hotspot in the viewing field corresponding to a pupil gaze angle is identified by the user's gaze direction and an image position of the augmented reality glasses.

6. An image processing method, comprising:

dividing an object block into a two-dimensional image;

identifying at least one view hotspot in a viewing field corresponding to a pupil gaze direction;

receiving the at least one view hotspot and an indicator signal; wherein the indicator signal is used to remark the object block;

generating a mask block corresponding to the object block according to the at least one view hotspot; wherein the indicator signal determines the label of the mask block;

displaying a menu according to the indicator signal; wherein the menu lists a plurality of candidate items;

regarding one of the candidate items in which there is at least one view hotspot as the label of the mask block; and interacting with the mask block and selecting the one of the candidate items in order to determine the label for the mask block.

7. The image processing method of claim 6, further comprising:

generating a hotspot map according to the at least one view hotspot; and inputting the hotspot map and the two-dimensional image into a convolutional neural network (CNN) model to identify the object block of the two-dimensional image.

8. The image processing method of claim 6, further comprising:

applying a scene segmentation model to segment the object block into the two-dimensional image and mask the object block.

9. The image processing method of claim 6, further comprising:

performing a three-dimensional reconstruction of the mask block to generate a three-dimensional object.

10. The image processing method of claim 6, further comprising:

capturing an eyeball image;

recognizing pupil shape from the eyeball image;

detecting a user's gaze direction; and identifying the at least one view hotspot in the viewing field corresponding to the pupil gaze angle from the user's gaze direction and the image position of augmented reality glasses.

* * * * *